United States Patent
Lopez-Batiz

[11] 3,743,889
[45] July 3, 1973

[54] POLYPHASE ELECTRIC SYSTEM PROTECTIVE APPARATUS

[75] Inventor: Manlio Lopez-Batiz, El Paso, Tex.

[73] Assignee: Hatch Incorporated, El Paso, Tex.

[22] Filed: Dec. 16, 1971

[21] Appl. No.: 208,881

[52] U.S. Cl. .................. 317/27 R, 317/47, 317/48, 317/46, 307/127
[51] Int. Cl. ............................................. H02h 3/32
[58] Field of Search ............... 317/47, 48, 27, 46; 324/86, 87; 307/127

[56] References Cited
UNITED STATES PATENTS

| | | | |
|---|---|---|---|
| 3,575,637 | 4/1971 | Krieger | 317/46 |
| 3,611,050 | 10/1971 | Weber | 317/48 |
| 3,428,865 | 2/1969 | Opad | 317/48 |
| 3,110,844 | 11/1963 | Brandt | 317/46 |
| 3,215,865 | 11/1965 | Grimme | 317/47 |
| 2,975,334 | 3/1961 | Callan | 317/48 |

Primary Examiner—J. D. Miller
Assistant Examiner—Harvey Fendelman
Attorney—Tom Arnold et al.

[57] ABSTRACT

Circuit means are connected across the phase conductors of a polyphase electric system to output a voltage responsive to the positive- or negative-sequence components of voltage in the system. The output voltage is provided to voltage-responsive means for interrupting the polyphase system, activating a warning device, indicating the value of the voltage components, or the like.

19 Claims, 3 Drawing Figures

3,743,889

POLYPHASE ELECTRIC SYSTEM PROTECTIVE APPARATUS

BACKGROUND OF THE INVENTION

This invention relates in general to apparatus for use with polyphase electric power systems, and more particularly to apparatus responsive to changes in positive- or negative-sequence components of voltage resulting from reversed phases, open phases, and voltage unbalances in polyphase electric systems.

In polyphase electric equipment, such as three-phase electric motors, for example, it is important that the positive, or intended, sequence of phase voltages be maintained at all times. If such a motor is energized by a polyphase source having the wrong, or reverse, phase rotation, the motor will rotate in the reverse direction. Equipment driven in the reverse direction can be seriously damaged, and in certain applications, such as elevators, hoists, and the like, poses a substantial safety hazard.

If an attempt is made to start a three-phase motor when one phase of the three-phase power system is open, dangerously high currents may be generated in the motor. The overheating which results can seriously damage a motor in a very short time and with little warning.

Various apparatus is available for preventing the starting of a polyphase motor when the phase sequence of the power source is reversed or when one phase is open. One example is the phase-failure relay, consisting of a small induction motor or disk on which one of a pair of contacts is located. The contacts are held in the open position by a spring. The relay contains a series of coils which are connected in the motor phases so as to produce a torque which turns the disk, overcoming the spring and causing the contacts to close, when all phases are conducting and the phase sequence is correct. If one phase is open, no torque is produced, and the spring tension holds open the contacts. If phases are reversed, the torque will act in the opposite direction, also holding the contacts in the open position.

Whether such a phase-failure relay will protect a running motor on the failure of one phase depends upon the load on the motor. A heavily loaded running motor, on single-phasing, would produce severely unbalanced terminal voltages which would cause such a relay to open. However, a lightly loaded running motor will continue to maintain a three-phase voltage across its terminals even when single-phased. If the relay is connected in this system between the fault and the motor, the voltage provided by the motor may continue to hold the relay in the closed position. This problem may be overcome by using current relays, in which current transformers are connected in the phases. In the event of a single-phase condition, the relay would be activated by the resulting current changes. However, such relays are heavy, expensive, have inherently high power consumption, and may generate an undesirable amount of heat.

An alternative approach for detecting an open phase is the use of one or more thermocouples in the motor to detect a rise in temperature due to the high currents produced by a single-phase condition. Means responsive to the output from the thermocouples then effect disconnection of the motor from the line. One problem with such an approach is the likelihood that damage will be done before the disconnecting circuit can be activated by the temperature detecting means.

Many attempts have been made to develop reliable and efficient apparatus responsive to phase-reversals and open-phase conditions in polyphase electric systems without the above limitations. For example, U.S. Pat. No. 3,110,844 discloses an open and reverse phase protective system for polyphase electric apparatus in which a negative sequence voltage filter, consisting of a capacitor having a capacitive reactance $X_c$ and three identically valued resistors each having a resistance equal to $\sqrt{3}\,X_c$, is combined with an undervoltage device and a set of current transformers to protect load apparatus in a polyphase system. As undervoltage devices are generally not effective to protect lightly loaded induction motors from open phase conditions, current transformers are still required in this apparatus. U.S. Pat. No. 3,110,844 concedes that the negative-sequence voltage filter disclosed therein is unable to protect the polyphase system from all open-phase conditions, requiring a very complex protective scheme to achieve that protection.

U.S. Pat. No. 3,215,865 discloses an automatic switch controller consisting of circuit means connected across the lines of a three-phase source to output a voltage suitable to hold a circuit interruptor in the closed position only when all phase voltages are present and in proper sequence. This controller, however, operates on the basis of the phase sequence and magnitude of the individual voltages, and, therefore, may be nonresponsive to an open phase condition in a circuit supplying a lightly loaded three-phase induction motor. This apparatus further requires that a voltage be maintained across the circuit interruptor to hold it in the closed position, so that a potentially undesirable use of power occurs when system conditions are normal.

Numerous devices and circuits have long been known in the art for sensing the direction of rotation of the vectors representing the phase voltages of polyphase systems or the relative magnitudes of the individual phase voltages. These devices and circuits, however, have been generally unsatisfactory in the detection of phase losses in polyphase systems including running polyphase induction motors. Reliable and efficient apparatus responsive to phase-reversals and open-phase conditions in polyphase electric systems, and especially open-phase conditions occurring while polyphase load apparatus is running under light load conditions, has not heretofore been available.

SUMMARY OF THE INVENTION

The present invention relates generally to positive- and negative-sequence voltage filter circuits, or networks, which may be connected across the phase conductors of a polyphase electric system to output a voltage response to the corresponding phase-sequence components of voltage present within the system. The voltage output from the circuit is provided to voltage-responsive means such as circuit interruptors, warning devices, meters, and the like.

The positive- and negative-sequence voltage filter networks of this invention rely upon the application of the theory of symmetrical components to the selection of circuit impedance such that the network is substantially nonresponsive to the opposite, i.e., negative- or positive-, respectively, sequence components of voltage. Connection of the network in line-to-line relationship with the phase conductors of the polyphase electric system eliminates the effect of zero-sequence components of voltage, if any.

The voltage output of the positive- or negative-sequence voltage filter networks of this invention may be used to activate circuit interruptors to disconnect protected equipment from the system, to operate visual or audible warning devices, or to drive meters or recorders for indicating or recording the instantaneous values of the positive- or negative-sequence components of voltage in the polyphase electric system so that an operator may take appropriate action when necessary to protect the system equipment from damage.

It is, therefore, a general object of this invention to provide apparatus useful in the protection of polyphase electric systems, including motors, generators, transformers, and the like, from open-phase and reverse-phase conditions, and system voltage unbalances.

Another object of this invention is to provide apparatus responsive to reverse-phase, open-phase, and unbalance conditions in polyphase electric systems under all load conditions.

Among the further objects of this invention is to provide apparatus responsive to the presence and magnitude of negative-sequence components of voltage due to phase reversals, open phases, and voltage unbalances in three-wire or four-wire, grounded or ungrounded, conventional three-phase electric systems.

BRIEF DESCRIPTION OF THE DRAWINGS

The present invention will be better understood and more fully appreciated from the following description taken in conjunction with the accompanying drawings.

DESCRIPTION OF PREFERRED EMBODIMENTS

Figure 1:
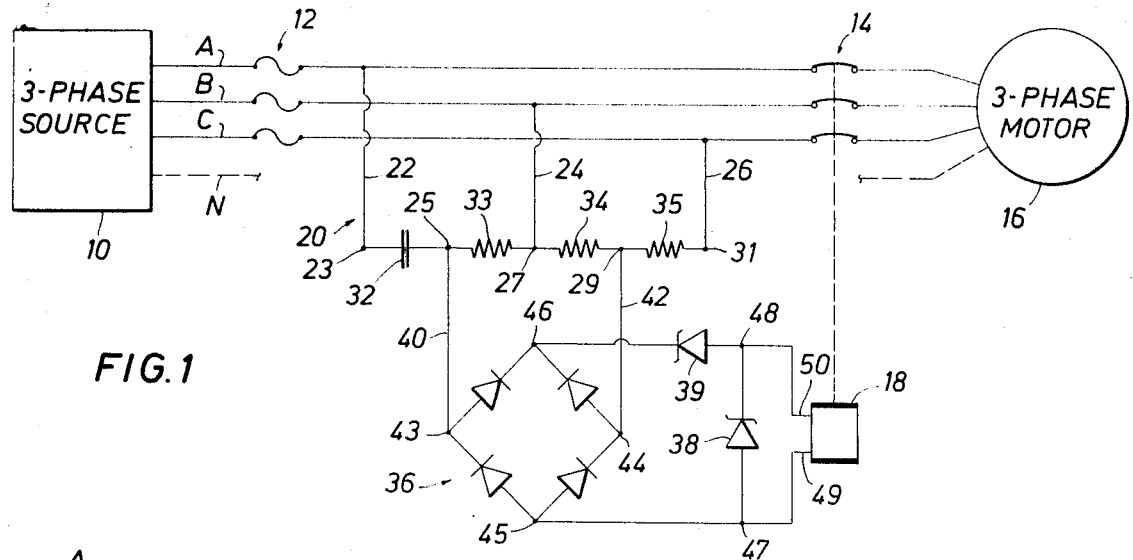
FIG. 1 is a schematic circuit diagram illustrating one embodiment of the present invention.

In FIG. 1 a polyphase electric power system is represented schematically by a simplified circuit in which conventional three-phase source 10 is connected to a three-phase electric induction motor 16 by phase conductors, or lines, A, B, and C. A neutral line, N, may or may not be present in the system, and, if present, may be grounded or ungrounded. The apparatus of the present invention operates satisfactorily whether or not there is a neutral line in the polyphase electric system and, if there is such a line, whether or not it is grounded. Lines A, B, and C include a set of individual line fuses 12 and a circuit interruptor 14.

A negative-sequence voltage filter network 20 has three input lines, 22, 24, and 26, connected to lines A, B, and C, respectively. A first leg of the filter is connected between line A and line B and includes capacitor 32 and resistor 33. A first output terminal is defined between the capacitor and resistor at the point designated by reference numeral 25. A second leg is connected between lines B and C and includes resistors 34 and 35. The connection of line B with the filter is through common line 24. The second leg defines a second output terminal 29 between resistors 34 and 35. The relative values of capacitor 32 and resistors 33, 34, and 35 are selected, as will be discussed hereinafter, to output a voltage between points 25 and 29 responsive to the negative-sequence components of voltage in the power lines.

The voltage output at terminals 25 and 29 is connected by lines 40 and 42, respectively, to a conventional full-wave bridge rectifier 36. Rectifier 36 accepts the alternating-current voltage output of network 20 at points 43 and 44, and puts out a proportional direct-current voltage between negative terminal 45 and positive terminal 46. This DC voltage is supplied to relay 18 at terminals 49 and 50. When the rectifier's voltage output is of sufficient magnitude, as may be determined by characteristics of the relay, relay 18 is actuated to open circuit interruptor 14. In this embodiment, a Zener diode 38 is connected in parallel with relay 18, between points 47 and 48, the cathode of the diode being connected to positive output terminal 46 and the anode connected to negative output terminal 45 of the rectifier. One function of diode 38 is to provide an alternate path for the direct-current voltage output of the rectifier when that voltage exceeds the breakdown level of the diode, such that an excessive current will not be impressed across relay 18. Another function of diode 38 is to limit the voltage difference between points 25 and 29, thereby protecting the individual components of network 20 from severe conditions which may result on the occurrence of a phase reversal or the like. This protection allows the use in network 20 of components rated for ordinary conditions without imposing the corresponding limits on the complete device, resulting in improved flexibility and performance of the apparatus of the present invention under adverse line conditions. It will also be appreciated that Zener diode 39 may be connected in series with relay 18 to establish a minimum voltage which must be present to enable conduction to the relay. The selection and application of Zener diodes is well known to those skilled in the art of electrical systems.

It will be understood that rectifier 36 is not required for operation of this invention, as the output of network 20 might be supplied directly to an alternating-current relay, meter, warning device, or other voltage-responsive element. The voltage-responsive means 19 identified in the partial schematic of FIG. 2 may be responsive to alternating-current or direct-current voltages. If voltage-responsive means 19 is a direct-current device, it will require that an appropriate rectifier, such as rectifier 36 in FIG. 1, be utilized between network 21 and voltage-responsive means 19.

Figure 2:
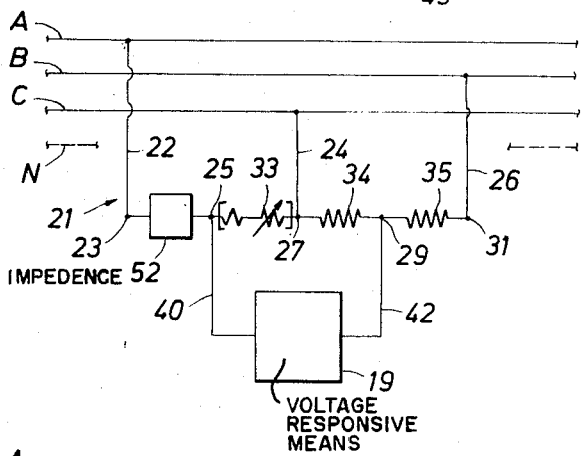
FIG. 2 is a partial schematic circuit diagram illustrating an alternative embodiment of the present invention.

Network 21 of FIG. 2 is similar to network 20 of FIG. 1 except that input lines 24 and 26 are connected to lines C and B, respectively, rather than B and C, and capacitor 32 has been replaced with impedance 52. The effect of reversing input lines 24 and 26 of network 20 is to convert that network from a negative-sequence voltage filter to a positive-sequence voltage filter. The same result might also be achieved by replacing capacitor 32 with an inductor of proper value. Similarly, network 21 may be either a positive-sequence voltage filter or a negative-sequence voltage filter, depending on the characteristics of impedance 52. Although the selection of relative component values is discussed in detail hereinafter, it may generally be noted that network 21 will function as a negative-sequence voltage filter when impedance 52 is an inductor of proper value, and as a positive-sequence voltage filter when impedance 52 is identical to capacitor 32.

Figure 3:
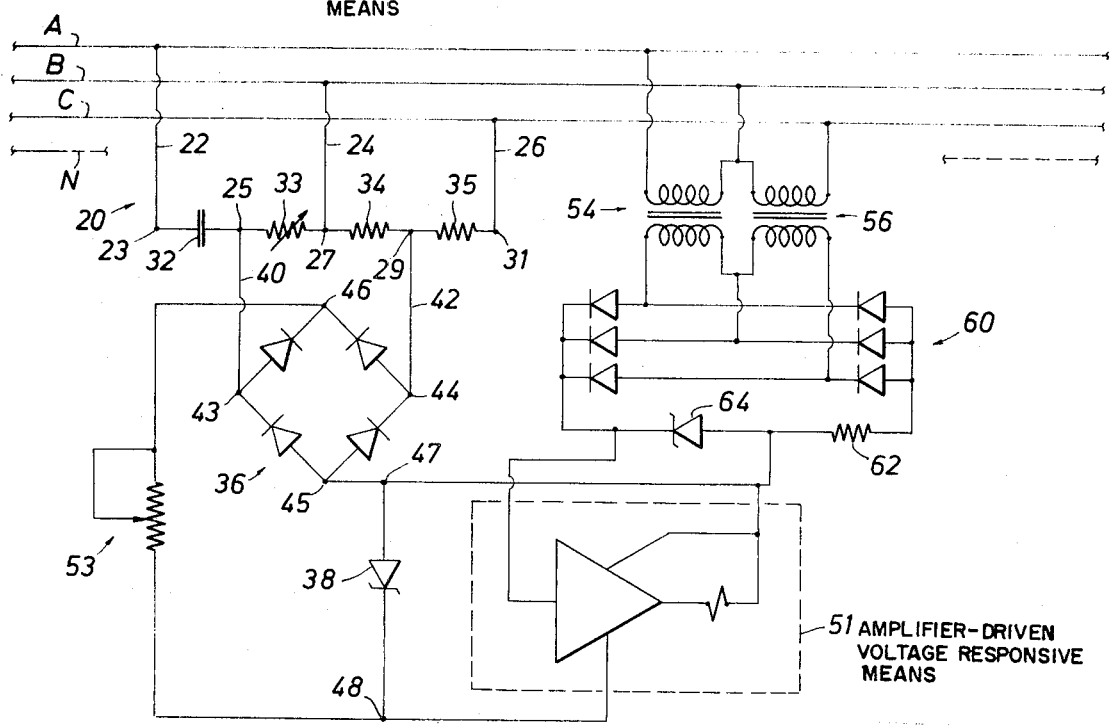
FIG. 3 is another partial schematic circuit diagram illustrating a further alternative embodiment of the present invention.

FIG. 3 illustrates another embodiment of the present invention wherein amplifier-driven voltage responsive means are connected to the output of rectifier 36 for actuation upon phase reversal, open phase, or voltage unbalance conditions in the lines A, B, and C. In this embodiment, negative-sequence voltage filter network 20 and rectifier 36 are connected in the same manner as in the embodiment of FIG. 1. The rectifier output is fed to a suitably biased amplifier-driven voltage responsive device 51, such as an amplifier-driven relay, warning signal, recorder, meter, or the like. A variable resistor 53 may be provided between the rectifier and the control input of the amplifier to adjust the sensitivity of device 51 to the output from the rectifier. Zener diode 38 performs the same function in this embodiment as it does in the embodiment of FIG. 1. The breakdown voltage of Zener diode 38 should be coordinated with the minimum control voltage required by the amplifier, as well as by the ratings of the components of network 20.

Conventional amplifier-driven relays or other amplifier-driven voltage responsive means may conveniently be utilized in the present invention to achieve the various objectives which may be desired, and may include one or more stages of amplification, as will readily be appreciated by those familiar with electric circuit design. The use of amplifier-driven voltage responsive means in this embodiment is particularly advantageous in that the circuit may be made responsive to very low levels of line voltage unbalance conditions.

Because the apparatus of this embodiment may be used in the detection and monitoring of relatively small line voltage unbalances, the amplifier bias power supply is isolated from the line conductors through transformers 54 and 56. The transformers are connected in open delta primary and secondary with three-phase full-wave rectifier 60 at the transformer's output. Resistor 62 is included for current limiting, and Zener diode 64 protects the amplifier from excessive voltages in the primary circuit. Of course, other means may be used for isolating the amplifier bias power supply from the line conductors, such as, for example, using a battery or an external power source, as will be recognized by electrical designers.

Two terms are commonly used in describing the degree of line voltage unbalance in a polyphase electric system. The first is "NEMA (National Electric Manufacturers' Association) percent unbalance," which is the maximum voltage deviation from average voltage as a percentage of the average voltage. The second is "unbalance factor," which is the ratio of negative-sequence to positive-sequence components of voltage in the system. These terms are not interchangeable, and either may be used on occasion by electric equipment manufacturers to indicate the level of voltage unbalance to which the equipment may be exposed without damage. Although not exactly the same, values of NEMA percent unbalance as high as about 3 percent and unbalance factors as high as about 0.03 may be regarded as within the range acceptable for operation of most electric equipment in connection with polyphase electric systems. As the degree of system unbalance increases, the danger of damage occurring from, for example, excessive heating in induction motors or generators, also increases. Of course, the limits of permissible voltage unbalance in any polyphase electric system will vary with the equipment comprising that system.

Apparatus in accordance with this embodiment of the present invention has been found capable of operating a circuit interruptor at levels of voltage unbalance factor below 0.01. Of course, achievement of this level of circuit sensitivity to line voltage unbalances makes it quite important to eliminate spurious voltage inputs to the amplifier, a result achieved in substantial measure by the performance of network 20 and tempered by variable resistor 53, to avoid unnecessary circuit interruptor actuation or erroneous operation of the various other voltage-responsive means which may be used.

As stated above, the figures are merely illustrative of the various embodiments of this invention. Source 10 may be a generator, a transformer, or merely an extension of lines A, B, and C (and N, if the system has a neutral) to some portion of a larger system. In like manner, induction motor 16 is merely illustrative of equipment in connection with which the apparatus of this invention may be useful. It will be appreciated that this invention may be applied to the protection of generators, transformers, and other electric equipment, as well as motors.

Similarly, the voltage-responsive means 19 of this invention may be any type of relay, visible or audible warning means, meters, recorders, or other elements or combinations of elements, including amplification stages, as may be desired.

No current transformers are required in the apparatus of this invention. The negative-sequence voltage filter network may be rated for continuous operation under all line conditions, including phase reversals, by utilizing voltage limiting means such as Zener diode 38 between points 25 and 29 as illustrated in FIGS. 1 and 3. No ground connections are required. Potential transformers may be required when the system voltage exceeds 600 volts in order that an appropriate voltage may be provided to the voltage-responsive means of the various embodiments of this invention. As discussed above, potential transformers 54 and 56 of FIG. 3 may be eliminated from that embodiment by using an external amplifier bias power supply.

In Operation

The occurrence of a phase reversal, open phase, or other voltage unbalance condition in a three-phase electric system will result in an unbalanced set of voltages in the individual phases of the system. The vectors which represent these unbalanced voltages may be neither equal in magnitude nor separated by 120 electrical degrees. According to the theory of symmetrical components, this unbalanced set of voltage vectors may be resolved into three balanced sets of vectors, designated positive-sequence, negative-sequence, and zero-sequence. If the line-to-neutral voltages of the three phases are designated A, B, and C respectively, the positive-sequence voltages conventionally rotate in a counterclockwise direction to produce instantaneous peak voltages in the sequence A, B, C. The negative-sequence vectors rotate counterclockwise with instantaneous values in the sequence C, B, A. This sequence is referred to as negative because it is opposite the sequence A, B, C arising on the counterclockwise rotation of the positive-sequence vectors. Note that the sequence has no reference to the direction of rotation of the vectors themselves. The zero-sequence vectors are in phase, and the maxima of their instantaneous values occur simultaneously.

Negative-sequence components of voltage are produced by a phase reversal, open phase, or other voltage unbalance in a three-phase electric system, and are proportional to the voltage unbalance in the system. In one embodiment of this invention, negative-sequence voltage filter network 20 is connected in line-to-line relationship with the three-phase, or line, conductors, A, B, and C. When the system is operating in a balanced condition, only positive-sequence components of voltage are present in the system, and there is no voltage output from the negative-sequence voltage filter network. When a voltage unbalance occurs, giving rise to negative-sequence components of voltage in the system, the negative-sequence voltage filter network outputs a voltage between points 25 and 29 proportional to the magnitude of the negative-sequence components present in the system. As illustrated in FIGS. 1 and 3, such a voltage may be supplied to a full-wave bridge rectifier, to convert the alternating-current voltage output of the network into a direct-current voltage. The direct-current voltage is then applied to relay 18, amplifier-driven means 51, or the like. When the voltage output of the rectifier is applied to relay 18, for example, and exceeds the threshold required for activation of the relay, including any threshold established by Zener diode 39, the relay operates circuit interruptor 14, opening the three line conductors of the system. Of course, the relay may operate an audible or visual alarm, initiate a sequence or blocking operation, or accomplish other similar functions.

It will be understood, and is illustrated by FIG. 2, that the rectifier and relay are merely illustrative of one embodiment of this invention, and that other voltage-responsive means, such as alternating-current relays, visual or audible warning devices, or meters, for example, may be connected across the output of the negative-sequence voltage filter network to respond to such output.

Network Impedence Values

The selection of relative impedance values for the positive- and negative-sequence voltage filter networks of this invention is based on the theory of symmetrical components. The voltages in any unbalanced three-phase system are composed of positive-sequence, negative-sequence, and zero-sequence components. As the system voltage deviates from normal, balanced conditions, the magnitude of the negative-sequence components of voltage within the system increases and is subject to mathematical analysis by the theory of symmetrical components. The apparatus illustrated in FIG. 1 is responsive to reversed phases, open phases, and voltage unbalances because all of these conditions create negative-sequence components of voltage in the system. The zero-sequence components of voltage are eliminated from the filter output by using only line-to-line circuit connections in the various embodiments of this invention.

The output of negative-sequence voltage filter network 20 between points 25 and 29 for any given conditions of voltage unbalance is determined by the relative values of the impedance elements of the network. These elements are designated in FIG. 1 by reference numerals 32, 33, 34, and 35, and will be assumed to approximate the impedances of their respective network circuit legs between the phase lines and the network output lines.

By application of the theory of symmetrical components it may be shown that a relationship between the impedances 32, 33, 34, and 35 exists for which the network output will contain no positive-sequence components of voltage. Under these conditions, the network voltage output will be responsive only to the negative-sequence components of voltage in the polyphase system and will be zero for ideal system and network conditions. This relationship is determined as follows:

Let the value of element 32 = $Z_c$
Let the value of element 33 = $R_1$
Let the value of element 32 = $R_2$
Let the value of element 35 = $R_3$
Let the current in the first leg of network 20 be (clockwise) $I_1$
Let the current in the second leg of network 20 be (clockwise) $I_2$
Let the current in the output circuit of network 20 be (clockwise) $I_x$
Let the voltage in the first leg of network 20 be $V_{AB}$
Let the voltage in the second leg of network 20 be $V_{BC}$
Let the impedance between lines 40 and 42 (looking away from network 20) be $Z_x$ Then the voltages in the two network legs may be expressed:

$$V_{AB} = I_1(R_1 + Z_c) - I_x(R_1) \qquad [1]$$
$$V_{BC} = I_2(R_2 + R_3) - I_x(R_2) \qquad [2]$$

As the sum of the voltages around a closed path is zero:

$$0 = I_x(R_1 + R_2 + Z_x) - I_1(R_1) - I_2(R_2) \qquad [3]$$

Solving equations [1] and [2] for $I_1$ and $I_2$:
$I_1 = [V_{AB} + I_x(R_1)]/(R_1 + Z_c)$
$I_2 = [V_{BC} + I_x(R_2)]/(R_2 + R_3)$
Substituting in equation [3]:

$$0 = I_x(R_1+R_2+Z_x) - R_1\left[\frac{V_{AB}+I_x(R_1)}{R_1+Z_c}\right] - R_2\left[\frac{V_{BC}+I_x(R_2)}{R_2+R_3}\right]$$

solving for $I_x$:

$$I_x = \frac{V_{AB}(R_1R_2+R_1R_3)+V_{BC}(R_1R_2+R_2Z_c)}{\begin{bmatrix}R_1R_2R_3+R_1R_2Z_c+R_1R_3Z_c+R_2R_3Z_c\\+R_1R_2Z_x+R_1R_3Z_x+R_2Z_cZ_x+R_3Z_cZ_x\end{bmatrix}}$$

applying the theory of symmetrical components and letting
$V_{AB_1}$ = positive-sequence components
$V_{AB_2}$ = negative-sequence components $$I_x = \frac{\begin{bmatrix}(R_1R_2+R_1R_3)(V_{AB_1}+V_{AB_2})+(R_1R_2\\+R_2Z_c)(a^2V_{AB_1}+aV_{AB_2})\end{bmatrix}}{\begin{bmatrix}R_1R_2R_3+R_1R_2Z_c+R_1R_3Z_c+R_2R_3Z_c\\+R_1R_2Z_x+R_1R_3Z_x+R_2Z_cZ_x+R_3Z_cZ_x\end{bmatrix}}$$

$$I_x = \frac{\begin{bmatrix}V_{AB_1}[R_1R_2+R_1R_3+a^2(R_1R_2+R_2Z_c)]\\+V_{AB_2}[R_1R_2+R_1R_3+a(R_1R_2+R_2Z_c)]\end{bmatrix}}{\begin{bmatrix}R_1R_2R_3+R_1R_2Z_c+R_1R_3Z_c+R_2R_3Z_c\\+R_1R_2Z_x+R_1R_3Z_x+R_2Z_cZ_x+R_3Z_cZ_x\end{bmatrix}}$$

to obtain a negative-sequence voltage filter, set the positive-sequence components equal to zero:
$O = R_1R_2 + R_1R_3 + a^2(R_1R_2 + R_2Z_c)$
and solve for $Z_c$ in terms of $R_1$, $R_2$, and $R_3$:
$Z_c = [(R_1R_2 + R_1R_3 + a^2 R_1R_2)/a^2 R_2]$ $$Z_c = \frac{R_1R_2 + R_1R_3 + a^2R_1R_2}{a^2R_2}$$

$$Z_c = -R_1 \left[ 1 + \left(1 + \frac{R_3}{R_2}\right) a^{-2} \right]$$

$$Z_c = -R_1 \left[ 1 + \left(1 + \frac{R_3}{R_2}\right) \underline{/-240°} \right]$$

$$Z_c = -R_1 \left[ 1 - \left(1 + \frac{R_3}{R_2}\right) \underline{/-60°} \right]$$

$$Z_c = -R_1 \left[ 1 - \left(1 + \frac{R_3}{R_2}\right)(\cos 60° - j \sin 60°) \right]$$

$$Z_c = -R_1 \left[ 1 - \left(1 + \frac{R_3}{R_2}\right)\left(\frac{1}{2} - \frac{j\sqrt{3}}{2}\right) \right]$$

$$Z_c = -R_1 \left[ 1 - \frac{\left(1 + \frac{R_3}{R_2}\right)(1 - j\sqrt{3})}{2} \right]$$

For the case $R_1 = R_2 = R_3 = R$ (a resistance)
$Z_c = -j \sqrt{3} R$ (a capacitive reactance)
Similarly, when $R_2 = R_3$:
$Z_c = -j \sqrt{3} R_1$ It will be understood that while the symbols $R_1$, $R_2$, and $R_3$ are generally regarded as representing resistances, the quantities which they represent in any real circuit may include other impedance quantities as well without affecting the foregoing analysis. The presence of such impedance quantities, if any, will be reflected in the solution of the above relationship for the impedance $Z_c$ when given the values $R_1$, $R_2$, and $R_3$. The theoretical solution is greatly simplified, of course, for the case where $R_1 = R_2 = R_3 = R$. For those cases in which the given values of $R_1$, $R_2$, and $R_3$ produce a solution including negative resistance, the values of one or more of the given impedances must be changed to yield a practicable solution. It will be appreciated that in such cases the simple exchanging of impedance elements $R_2$ and $R_3$ will often result in an acceptable solution.

It is readily apparent from the foregoing that the network component value relationships may conveniently be satisfied by selecting $R_2$ and $R_3$ as substantially identical impedances, selecting $Z_c$ as a capacitance of known value, and then locating, assembling from a plurality of component elements, calibrating, or otherwise obtaining an impedance $R$, which satisfies the relation:

$$R_1 = -(Z_c/j \sqrt{3})$$

One manner in which this relationship might be satisfied is by using a variable resistor which may be calibrated to match the selected capacitor, although $R_1$ might be made up from two, three, or more individual component elements such as commercially available resistors or even a combination of one or more other elements with a variable resistor.

The foregoing circuit analysis and impedance element determination is for negative-sequence voltage filter network 20. A similar approach to other networks will provide equivalent results.

Negative-sequence voltage filter network 20 having impedance values related to each other as above described will output no voltage between points 25 and 29 in the absence of unbalanced conditions in the electric power system across which it is connected. Accordingly, the voltage-responsive means connected to the outputs of such networks are normally inactive.

Small variations in relative impedance values, such as may be inherent in the use of commercially available components, may result in the output of voltages at points 40 and 42 responsive in part to positive-sequence components of voltage in the system. Within reasonable limits such variations may be accommodated by the apparatus of this invention. In particular, the network may be calibrated to account for the presence of any voltage output due to other than negative-sequence components, and the voltage-responsive means compensated for such effects.

It will be appreciated that the selection of impedance values for resistance legs $R_1$, $R_2$, and $R_3$ may include consideration of the level of output voltage desired from network 20 for the various system fault conditions. A principal consideration in this regard is that the output voltage of network 20 must be sufficient to reliably actuate a relay-operated circuit interruptor upon the occurrence of an open phase in any line conductor with motor 16 operating substantially unloaded.

In the embodiment of this invention illustrated in FIG. 1, negative-sequence voltage filter network elements of the following values produced satisfactory results when used with a three-phase system having a voltage of 420 volts, 60 Hertz, and phase sequence, A, B, C. In this embodiment, direct current relay 18 has a resistance of 5,000 ohms, Zener diode 38 has a conduction threshold of 24 volts, there is no Zener diode 39, and motor 16 is rated at 5 horsepower.

| Resistor 33 | 1720 ohms |
| Resistor 34 | 1650 ohms |
| Resistor 35 | 1650 ohms |
| Capacitor 32 | 0.857 microfarads |

The following table represents typical circuit parameters responsive to various fault and load conditions within the above system, as compared to normal operating conditions.

| Fault Condition | Percent Load On Motor | Voltage To Relay DC Volts | Current To Relay ma. |
| --- | --- | --- | --- |
| None | 0 | 0.4 | 0.15 |
| None | 50 | 0.5 | 0.13 |
| Phase Reversal | 0 | 23 | 50 |
| Open Phase A | 0 | 6.5 | 2.3 |
| B | 0 | 7.0 | 2.3 |
| C | 0 | 8.4 | 2.3 |
| Open Phase A | 50 | 9.6 | 2.5 |
| B | 50 | 10.5 | 2.6 |
| C | 50 | 10.8 | 2.6 |

The above selection of circuit component values provides a minimum voltage of 6.5 volts to the relay under the most difficult to detect circuit faults, i.e., an open phase condition when the motor is operating substantially unloaded. The effect of the load on the motor when an open-phase fault occurs is illustrated by the increased voltage to the relay for the case when the motor was operating at 50 percent load. Of course, components of other values may be utilized in the various embodiments of this invention, depending on the output characteristics desired of network 20.

It will be understood that by reversing any two leads of network 20, for example connecting point 27 to phase C and point 31 to phase B as shown in FIG. 2, the network will be converted to a positive-sequence voltage filter. Network 21 will function as a positive-sequence voltage filter when impedance 52 is the same as impedance 32 of FIG. 1. Although changes in the positive-sequence components of voltage in a system may be used together with voltage-response means for system protection, the difficulties in sensing and responding to relative differences in large values is much greater than sensing and responding to the difference between a normally zero value and a value indicative of a system fault.

Analysis of network 21 in accordance with the principles discussed above will show that by replacing impedance 32 by an appropriate impedance 52, network 21 will function as a negative-sequence voltage filter. The value of impedance 52 for this result when $R_1 = R_2 = R_3 = R$ is $+j\sqrt{3}\ R$, as may readily be confirmed by application of the theory of symmetrical components to the reversed-lead circuit. Similarly, when $R_2 = R_3$, $Z_c = +j\sqrt{3}\ R_1$. The capacitive circuit is preferred in the majority of applications, however, because capacitors are smaller, lighter, less expensive, and more efficient than inductors required to produce an equivalent voltage output from the corresponding network.

It will be understood by those skilled in the art that numerous variations and modifications may be made in the exemplary embodiment specifically disclosed herein without departing from the spirit and scope of the invention. For example, although the preceding discussion has been specifically directed to three-phase electric systems, it will be understood that the fundamental principles and concepts of this invention are applicable to systems of any number of phases. Therefore, it is not intended that the preceding embodiments circumscribe or limit the scope of this invention in any way except as it is limited by the appended claims.

What is claimed is:

1. Circuit means for outputting a voltage responsive to reverse phase, open phase, and voltage unbalance conditions in a conventional three-phase alternating-current electric system having first, second, and third line conductors each carrying a phase voltage, said phase voltages having a predetermined positive phase sequence of first, second, and third, and normally spaced apart 120 electrical degrees, comprising:

a first impedance connected between said first line conductor and a first output point;

a second impedance connected between said second line conductor and said first output point;

a third impedance connected between said second line conductor and a second output point; and a fourth impedance connected between said third line conductor and said second output point;

wherein said impedances generally satisfy the relation:

$$Z_c = -R_1\left[1 - \frac{\left(1+\frac{R_3}{R_2}\right)(1-j\sqrt{3})}{2}\right]$$

in which:

$Z_c$ is the value of said first impedance;
$R_1$ is the value of said second impedance;
$R_2$ is the value of said third impedance; and
$R_3$ is the value of said fourth impedance.

2. Apparatus for use with three-phase, three-wire and three-phase, four-wire alternating-current electric systems having first, second, and third line conductors each carrying a phase voltage, said voltages having a predetermined positive phase sequence of first, second, and third, comprising:

a negative-sequence voltage filter network connected in line-to-line relationship with said conductors to output a voltage responsive to the negative-sequence components of the line voltages and having:

a first leg, including first and second impedances in series, connected between the first and second line conductors and defining a first output point between said first and second impedances; and a second leg, including third and fourth impedances in series, connected at one end to said first leg at a point between the second impedance and the second line conductor and connected at the other end to the third line conductor and defining a second output point between said third and fourth impedances; and voltage-responsive means connected to the output of said network to respond to said output voltages representative of reversed phase and open phase conditions in said system;

wherein the relative values of said impedance generally satisfy the relation:

$$Z_c = -R_1\left[1 - \frac{\left(1+\frac{R_3}{R_2}\right)(1-j\sqrt{3})}{2}\right]$$

in which:

$Z_c$ is the value of said first impedance;
$R_1$ is the value of said second impedance;
$R_2$ is the value of said third impedance; and
$R_3$ is the value of said fourth impedance.

3. Apparatus as recited in claim 2, wherein said second, third, and fourth impedances comprise approximately equal resistances and said first impedance comprises a capacitive reactance.

4. Apparatus as recited in claim 2, wherein said third and fourth impedances are of equal value and the value of said second impedance is related to the value of said first impedance by the relation:

$$R_1 = -\left[\frac{Z_c}{j\sqrt{3}}\right]$$

5. Apparatus as recited in claim 2, wherein said second impedance comprises a plurality of impedance elements.

6. Apparatus as recited in claim 2, wherein said second impedance comprises a variable resistor.

7. Apparatus as recited in claim 2 including a full-wave bridge rectifier between the output of said negative-sequence voltage filter network and said voltage-responsive means to rectify the alternating-current voltage output of said filter network and provide a direct-current voltage proportional thereto to said voltage-responsive means.

8. Apparatus as recited in claim 2 including a Zener diode connected in parallel with said voltage-responsive means to limit the voltage differential between the output points of said network.

9. Apparatus as recited in claim 2 including a Zener diode in series with said voltage-responsive means to establish a voltage threshold below which no current is applied to said voltage-responsive means.

10. Apparatus as recited in claim 2, wherein said voltage-responsive means comprises relay means actuated by the output of said negative-sequence voltage filter network.

11. Apparatus as recited in claim 10, wherein said relay means is suitable for operating a circuit interruptor to simultaneously open said line conductors.

12. Apparatus as recited in claim 2, wherein said voltage-responsive means comprises a warning signal.

13. Apparatus for use with three-phase, three-wire and three-phase, four-wire alternating-current electric systems having first, second, and third line conductors each carrying a phase voltage, said voltages having a predetermined positive phase sequence of first, second, and third, comprising:

a negative-sequence voltage filter network connected in line-to-line relationship with said conductors to output a voltage responsive to the negative-sequence components of the line voltages and having:

a first leg, including first and second impedances in series, connected between the first and second line conductors and defining a first output point between said first and second impedances; and a second leg, including third and fourth impedances in series, connected at one end to said first leg at a point between the second impedance and the second line conductor and connected at the other end to the third line conductor and defining a second output point between said third and fourth impedances;

wherein the relative values of said impedances generally satisfy the relation:

$$Z_c = -R_1 \left[ 1 - \frac{\left(1 + \frac{R_3}{R_2}\right)(1 - j\sqrt{3})}{2} \right]$$

in which:

$Z_c$ is the value of said first impedance;
$R_1$ is the value of said second impedance;
$R_2$ is the value of said third impedance; and
$R_3$ is the value of said fourth impedance; and amplifier-driven voltage-responsive means connected to the output of said network to respond to said output voltages representative of reverse phase, open phase, and voltage unbalance conditions in said systems.

14. Apparatus as recited in claim 13, wherein amplifier bias power is provided from said line conductors to said amplifier through two transformers connected in open delta primary and secondary and a full-wave bridge rectifier.

15. Apparatus as recited in claim 13, wherein said amplifier-driven voltage responsive means includes a plurality of amplification stages.

16. Apparatus as recited in claim 13, wherein said amplifier-driven voltage responsive means comprise relay means to operate a circuit interruptor to simultaneously open said line conductors.

17. Circuit means for outputting a voltage responsive to positive-sequence components of voltage in a conventional three-phase alternating-current electric system having first, second, and third line conductors each carrying a phase voltage, said phase voltages having a predetermined positive phase sequence of first, second, and third, and normally spaced apart 120 electrical degrees comprising:

a first impedance connected between said first line conductor and a first output point;
a second impedance connected between said second line conductor and said first output point;
a third impedance connected between said second line conductor and a second output point; and
a fourth impedance connected between said third line conductor and said second output point;
wherein said impedances generally satisfy the relation:

$$Z_c = -R_1 \left[ 1 - \frac{\left(1 + \frac{R_3}{R_2}\right)(1 - j\sqrt{3})}{2} \right]$$

in which:

$Z_c$ is the value of said first impedance;
$R_1$ is the value of said second impedance;
$R_2$ is the value of said third impedance; and
$R_3$ is the value of said fourth impedance.

18. Circuit means for outputting a voltage responsive to positive-sequence components of voltage in a conventional three-phase alternating-current electric system having first, second, and third line conductors each carrying a phase voltage, said phase voltages having a predetermined positive phase sequence of first, second, and third, and normally spaced apart 120 electrical degrees, comprising:

a first impedance connected between said first line conductor and a first output point;
a second impedance connected between said third line conductor and said first output point;
a third impedance connected between said third line conductor and a second output point; and
a fourth impedance connected between said second line conductor and said second output point;
wherein said impedances generally satisfy the relation:

$$Z_c = -R_1 \left[ 1 - \frac{\left(1 + \frac{R_3}{R_2}\right)(1 - j\sqrt{3})}{2} \right]$$

in which:

$Z_c$ is the value of said first impedance;
$R_1$ is the value of said second impedance;
$R_2$ is the value of said third impedance; and
$R_3$ is the value of said fourth impedance.

19. Circuit means for outputting a voltage responsive to reverse phase, open phase, and voltage unbalance conditions in a conventional three-phase alternating-current electric system having first, second, and third line conductors each carrying a phase voltage, said phase voltages having a predetermined positive phase sequence of first, second, and third, and normally spaced apart 120 electrical degrees, comprising:

a first impedance connected between said first line conductor and a first output point;
a second impedance connected between said third line conductor and said first output point;
a third impedance connected between said third line conductor and a second output point; and
a fourth impedance connected between said second line conductor and said second output point;
wherein said impedances generally satisfy the relation:

$$Z_c = -R_1 \left[ 1 - \frac{\left(1 + \frac{R_3}{R_2}\right)(1 - j\sqrt{3})}{2} \right]$$

in which:

$Z_c$ is the value of said first impedance;
$R_1$ is the value of said second impedance;
$R_2$ is the value of said third impedance; and
$R_3$ is the value of said fourth impedance.

* * * * *